United States Patent Office 3,049,395
Patented Aug. 14, 1962

3,049,395
CONCENTRATED METHYLENE BLUE PASTE
Joseph C. Conger, Sr., Somerville, N.J., assignor to American Cyanamid Company, New York, N.Y., a corporation of Maine
No Drawing. Filed May 6, 1960, Ser. No. 27,285
3 Claims. (Cl. 8—79)

This invention relates to fluid pastes of Methylene Blue and more particularly to aqueous, storage-stable, non-settling, non-separating, non-crystallizing fluid pastes thereof, and to the production of the same.

Methylene Blue is an old and widely-used blue dyestuff having old Color Index No. 922. It is presently known as Basic Blue No. 9 and has the new Color Index No. 52,015. It is ordinarily produced, sold and used in dry powder form.

Methods for producing the dyestuff per se are well known. As they are usually practiced, the dye is formed as its hydrochloride salt. Since this salt is less easily isolated, it is usually converted to the zinc chloride double salt before the powder is collected and dried, about ninety percent of the powder production being in this form. Hereinafter, for purposes of simplicity, this double salt will be referred to simply as the "zinc" salt. The free base cannot be isolated by commercially practical means and of the possible salts only the hydrochloride and the zinc salt are ordinarily encountered.

Wide application is found for the dry dye as the zinc salt powder. One such, for example, is in dyeing and shading of paper. For such purposes, it is essential that a dye be readily water-soluble and that it be in a form wherein its dyeing strength may be easily and rapidly developed. The zinc salt powder does fulfill these requirements.

However, in the papermaking trade, as in others, the use of dye powders requires a high degree of skill and experience on the part of the operator. He must accurately weigh a portion and then add the dry dye to water to make up the dye solution. It is far more convenient to add the dye, to a paper furnish for example, by means of volumetric rather than gravimeteric measurement. Therefore, for many purposes, whenever it is possible to do so it is generally preferred to use dyes in fluid form.

For this reason, whenever it is feasible, the user ordinarily purchases his dye in the form of a concentrated solution. These solutions are ordinarily quite viscous. Usually they are as concentrated as possible while still retaining sufficient fluidity for volumetric measurement. Therefore, while they are essentially solutions they are commonly called "pastes." It is with such pastes that the present invention is concerned. For successful use such pastes must meet certain requirements.

First, they must contain a sufficiently high concentration of dyestuff. This is usually defined as percent of the dyeing strength of a standard or "type" dry dye powder. For convenience, it is always preferred that this be some simple fraction of the strength of the amount used as powder. Usually one-half or fifty percent strength is desired, although other strengths such as one-third or two-thirds are sometimes used.

Second, the paste must be readily reproducible in this standard strength, whatever the fraction chosen. New standards cannot be set for each new batch.

Third, the paste must be stable at ambient conditions for long periods of time. For this reason, the paste itself must be free from certain characteristics. It must show no tendency to settle into layers of differing dye strength. Equally important, components of the paste must not separate out into fractions which are difficult to recombine. Moreover, the dyestuff must not be permitted to crystallize since, thereafter, it would not flow from the container.

Since the paste must be readily and quickly soluble when added to water, it is obvious that it must not contain material which is not readily soluble in water or which separate out when the paste is diluted. This places limitations on solvents and other agents which might otherwise be available to increase the amount of dye in the paste.

Unfortunately, pastes of Methylene Blue, which completely meet these requirements, in the past have not been available. Storage-stable, non-separating, non-crystallizing pastes of the desired 50% dyeing strength could not be prepared by known methods from either the zinc salt or the hydrochloride. Nevertheless, if such a Methylene Blue paste could be prepared, it would be highly useful, not only in the papermaking trade, but in many others. It is, therefore, the primary object of this invention to provide such pastes.

The primary object of the present invention has been accomplished to a surprisingly successful degree by a combination of two simple factors. The first is to limit the paste to freedom from the zinc salt. Only the hydrochloride may be used successfully. The second is the addition of glycerine in controlled amounts with respect to the amount of water and dye present.

When the paste is properly prepared according to these requirements, it is not only readily possible to achieve the desired 50% dyeing strength, but the paste is readily reproducible and is storage-stable for long periods of time, even under adverse conditions.

In these terms, the simplicity of the invention is perhaps more apparent than real. Certain very definite limitations must be met. The first of these is that the composition must be substantially free of the zinc salt. This is the advantage in the present invention since it permits use of a hydrochloride salt press cake obtained in the normal course of manufacture without the necessity for producing the zinc salt. In this way also, freedom from zinc salt is easily insured.

It is to be understood that, as used herein, the term "zinc-free" does not necessarily mean 100% chemically free of zinc. If necessary, small amounts not exceeding about 0.5% of the total dyestuff may be tolerated. Nevertheless, even these small amounts should be avoided whenever it is possible.

Although the dyestuff being discussed and used herein is actually the hydrochloride salt, for simplicity it will be referred to below as the "dye." It is to be understood, however, that the amounts of "dye" mentioned are to be calculated for the salt, i.e. the hydrochloride.

In passing, it should be noted that, for several reasons, the only commonly used salt will be the hydrochloride. As noted above, the zinc salt is of no utility in forming the pastes of this invention. The hydrochloride salt is formed as a result of the use of hydrochloric acid, alone or with sulfuric, in the ordinary methods of preparation. The free base cannot be isolated readily which limits the salt to those which can be formed by substitution, i.e., replacement. Since the hydrochloride works well herein, there is no need to convert it to one of the limited number of salts which might be thus formed.

It is a further advantage of the invention that in using a dye press-cake, this can be done directly. It is neither necessary that it be specially purified, nor that it all be converted to a dry powder. While there ordinarily will be some variation in the actual content of water and dye in different press-cakes, this is not a serious problem. It is only necessary that the actual (i.e., "real") dye content be known. Usually this, too, is expressed in terms of dyeing strength (calculated on a dry basis) of the standardized type powder. In most cases, the real content of the press-cake will be found to be such that on a dry basis about 45–50 parts will be sufficient to prepare 100 parts of a 50% dyeing strength paste.

As second critical factor, the specific use of glycerine is necessary. This is a surprisingly unique feature. In many cases where glycerine previously has been used, as for example to prevent caking of dye compositions, it is also feasible to substitute therefor such closely related analogs as ethylene glycol, propylene glycol, the methyl and ethyl ethers of ethylene glycol, or the methyl ether of tripropylene glycol. In the present case only glycerine produces an operable result.

Substantially any good grade of glycerine may be used, the highest viscosity grades not being essential. However, as will be discussed below, if the water content is more than usually found in good commercial grades, it may be necessary to make an allowance therefor in establishing the water content in the finished product.

It is a peculiar feature of the finished dye paste that it must have both a glycerine content and a water content within certain limits. For example, using as illustrative the preparation of a fifty percent dyeing strength paste from a press-cake containing from some 75–90% real dye, a paste containing less than about 42–43% glycerine will show crystallization. If it contains more than about 50–52% glycerine, it is too stiff for volumetric use. At a glycerine content of about 56–57% and higher, the paste again will crystallize.

In order that enough dye may be incorporated in the paste, this limits the amount of water which the paste may contain. The lower amount of glycerine in the illustrative case corresponds to a water content of about 15%; the higher to about 6% of the water. In a 50% strength paste, these are about the widest limits which can be used if the other factors are balanced. However, it is preferable in a 50% paste to maintain a water content within the more limited range of from about nine to about eleven weight percent. Expressed in another way, glycerine:water weight ratio of from about 3:1 to about 9:1 may be used, but a ratio from about 4:1 to about 5:1 preferred. These ratios also must be maintained when using the higher or lower liquid contents which are required in a paste of lower or higher than 50% dyeing strength.

While other methods of combining the components of the paste may be used, a preferred embodiment using Methylene Blue hydrochloride press-cake of known real dye, and water content may be described as follows. Press-cake is added to glycerine in an amount sufficient to comprise in the finished paste the required amount of real dye and up to about 10% of water. The mixture is heated with stirring until the dye dissolves. The resultant solution or paste is then tested for dyeing strength. If necessary, its strength is adjusted by adding press-cake, or dry dye, or glycerine, or water as required.

The invention will be more fully described in conjunction with the following examples. Therein the dyeing strength is measured in percent of that of a standardized dye powder. All other parts and percentages are by weight. The dry dye used is obtained by drying press-cake obtained from commercial production and has a dye content such that about 41 parts will furnish the requisite real dye for a paste of 50% dyeing strength.

EXAMPLE 1

Portions of 41 parts of dry Methylene Blue hydrochloride were made up into paste in accordance with the general procedure outlined above but using varied added amounts of water and of high viscosity glycerine. Illustrative results are shown in the following table.

*Table I*

| Paste | Content (percent) | | Comments |
| --- | --- | --- | --- |
| | Water | Glycerine | |
| A | 0 | 59 | Crystallized Completely. |
| B | 5 | 54 | Paste Too Stiff. |
| C | 10 | 49 | Fluid Paste. |
| D | 15 | 44 | Some Crystallization. |
| E | 20 | 39 | Crystallized Completely. |

The 10% water content paste (C) has a dyeing strength of 50% against when compared with a commercial dry salt powder containing 82% real dye. Samples of paste C were placed in storage. No separation, settling or crystallization occurred even after six months. Samples of paste C which were frozen and thawed were not adversely affected thereby.

EXAMPLE 2

For comparison, attempts were made to repeat the procedure of Example 1 using the zinc salt in place of the hydrochloride. They were completely unsuccessful. Repeated experiments using smaller amounts of the zinc salt demonstrated that no paste containing as much as 1% of the zinc salt could be prepared without complete crystallization.

EXAMPLE 3

In order to demonstrate the preparation of dye pastes of strength other than 50%, the procedure of Example 1 was used to prepare pastes of different dyeing strength. Illustrative compositions are shown below in Table II.

*Table II*

| Component | Content (percent) | |
| --- | --- | --- |
| | Paste E | Paste F |
| Dye (dry basis) | 28 | 55 |
| Glycerine | 58 | 38 |
| Water | 14 | 7 |

Paste E when tested against the standard dry salt powder of Example 1 showed a dyeing strength of 33.3%. Paste F had a strength of 66.6%. Both pastes were fluid and exhibited no signs of separation or crystallization on standing.

I claim:

1. A substantially zinc-free aqueous dye paste which in storage is substantially non-settling, non-separating and non-crystallizing containing, in parts per 100 parts by weight of finished composition;
    (a) from about 33 to about 45 parts of Methylene Blue hydrochloride;
    (b) from about 6 to about 14 parts of water, and
    (c) sufficient glycerine to make up a total of 100 parts.

2. A composition according to claim 1 in which the water content is from about 9 to about 11 parts per 100 parts of paste.

3. A composition according to claim 1 in which the

Methylene Blue hydrochloride content is from about 39 to about 43 parts per 100 parts of paste.

References Cited in the file of this patent

UNITED STATES PATENTS

| | | |
|---|---|---|
| 1,754,285 | Schlatter | Apr. 15, 1930 |
| 2,006,720 | Rogers | July 2, 1935 |

OTHER REFERENCES

Pharmaceutical Formulas, The Chemist and Druggist, London, 1944, vol. I, pp. 217, 722, 725.

Dictionary of Dyes, Rawson, Charles Griffin and Co., London, 1901, p. 162.

"Colour Index," A.A.T.C. and C., Lowell, Mass., 1956, vol. 1, page 1642.